Patented Nov. 14, 1922.

1,435,498

UNITED STATES PATENT OFFICE.

ERNEST D. RESNIK, OF NEW HAVEN, CONNECTICUT.

DENTIFRICE.

No Drawing.   Application filed January 16, 1920.   Serial No. 351,930.

*To all whom it may concern:*

Be it known that I, ERNEST D. RESNIK, a citizen of the United States, and resident of New Haven, in the county of New Haven and State of Connecticut, have invented certain new and useful Improvements in Dentifrices, of which the following is a specification.

My invention relates to dentifrices.

Owing to the highly favorable conditions afforded by the accumulation of food particles and the formation of film between and upon the teeth for the harboring and growth of bacteria of many kinds harmful both to the teeth and gums and to the general health, it is highly desirable that a dentifrice should contain not only the usual gentle abrasive to assist the mechanical action of the tooth brush, but also therapeutic and prophylactic agents for destroying bacteria, and for rendering the oral cavity completely antiseptic.

An antiseptic substance, however, to be suitable for employment in a dentifrice, must be free from harmful effects upon the sensitive tissues of the mouth walls and from objectionable flavor. Furthermore, the substance must not react harmfully upon the teeth; and owing to the probability that it will reach the stomach, must be free from harmful effects upon the system of the user if swallowed. These limitations have heretofore prevented the employment in dentifrices of the more powerful antiseptics.

My invention comprises the employment in a dentifrice of a relatviely powerful antiseptic which is effective in combination with any of the usual abrasive, antiacid and prophylactic substances without interacting therewith, permitting the employment of ordinary dentifrice formulæ.

In particular, my invention includes the employment of a substance normally inactive, but adapted to liberate chlorine when used as a dentifrice, the powerful detergent and bleaching effect of chlorine being well known. Owing to the great strength of chlorine, it is necessary that the amount employed should be effectively limited; and an object of my invention is to employ a chlorine-liberating substance in such a manner that the amount of chlorine developed in use can be completely and accurately regulated.

While in the preferred form of my invention the chlorine-releasing substance which I employ is normally stable, it is possible that a slight amount of chlorine may be released thereby, especially when the dentifrice is stored for a long period of time before using. To avoid any possibility of objectionable effects from chlorine generated prior to use of the dentifrice, I may employ a substance preferably compounded with the dentifrice and adapted to take up the small quantity of free chlorine which might be released during storage.

For this purpose, I may employ a thiosulfate, which is adapted to fix free chlorine, the quantity of thiosulfate necessary being obviously so small that it will not interfere with the release of a substantial amount of chlorine when the dentifrice is actually used.

In the specific form of my invention, I also employ a substance which is adapted to generate oxygen when used as a dentifrice, the oxygen, especially in its nascent state, being particularly effective in destroying putrefactive tissue. I preferably employ a hypochlorite as the chlorine-releasing substance, and specifically have found calcium hypochlorite and sodium hypochlorite, either singly or in combination, suitable for the purpose, these substances being soluble in water; but it is to be understood that I do not consider my invention as limited to a soluble hypochlorite, and other substances known to those skilled in the art as adapted to release chlorine readily may be employed. While the hyochlorites mentioned are normally stable, it is possible that under certain conditions a slight decomposition may take place, developing a quantity of free chlorine. To avoid the presence of free chlorine prior to the use of the composition as a dentifrice, I may provide a substance adapted to take up any free chlorine which is generated, such substance preferably being employed in such a small quantity that it will have no material effect whatever upon the liberation of chlorine in the mouth, being simply ample to take care of the extremely small amount of chlorine which may conceivably be evolved while the dentifrice is in its container. While various well-known substances may be employed for this purpose, I have found that a thiosulfate is particularly suitable therefor, preferably employing a soluble thiosulfate, such as sodium thiosulfate.

The substances so far enumerated have been so selected and combined that they may be used with any suitable proportions of the common elements employed in dentifrices, For instance, it is customary to employ a gentle abrasive, such as precipitated calcium carbonate (chalk), and a pure, flavorless soap, such as castile, which comprise a substantial part of the usual dentifrice. Alcohol, thymol, and glycerine are also commonly employed with the remaining ingredients, and as possessing a strongly antiseptic effect, glycerine being also useful for its dehydrating effect. Various other substances may be used, either for their general beneficial effect or as correctives of specific oral conditions, such as pyorrhea. Zinc salts provide one example of this type of substances, zinc sulfide and chloride being generally employed. Suitable flavoring substances are also commonly used, such as eucalyptol, oil of peppermint, oil of cinnamon, saccharine, and many others. These substances and others are well known in the art for their pleasing and beneficial properties when used in dentifrices, and any desired assortment and proportions thereof may be used without affecting my invention.

It will be apparent that by employing a fixed percentage of hypochlorite in the composition, and by thoroughly intermingling the substances, the amount of chlorine generated can be accurately and completely regulated, as the amount of chlorine generated by a fixed amount of the hypochlorite is well known. Furthermore, the amount of chlorine-fixing substance, such as sodium thiosulfate, is so regulated that any surplus chlorine generated will be absorbed thereby, the amount of thiosulfate employed being insufficient to affect the generation of chlorine when the dentifrice is actually applied to the teeth. A suitable formula for compounding my invention includes the following.

|  | Grams. |
|---|---|
| Powdered castile soap | 20.00 |
| Precipitated chalk | 30.00 |
| Glycerine | 25.00 |
| Zinc chloride | 1.00 |
| Alcohol | 10.0 |
| Eucalyptol | .240 |
| Oil of cinnamon | .125 |
| Oil of peppermint | .150 |
| Saccharine | .300 |
| Sodium or calcium hypochlorite, either or both, 1% solution in water | 100.00 |
| Sodium thiosulfate | .20 |

It will be understood that this formula is wholly illustrative, and is only one of the many combinations of ingredients involved in my invention with others well known to the art which may be made. If desired, I may employ zinc sulphide in place of zinc chloride, and many other obvious substitutions of chemical equivalents may be made.

Furthermore, while I have disclosed certain fixed proportions of the various ingredients, my invention is not restricted even approximately to these proportions. The soap and chalk, together with the glycerine and alcohol, are included in proportions varying in accordance with the specific consistency desired, the chalk providing an abrasive effect, the soap providing solvent and cleansing qualities, and the glycerine and alcohol serving to determine the plasticity of the paste. The eucalyptol, essential oils and saccharine are for flavoring purposes, and are employed in any suitable combination and proportion, according to the flavor desired. The hypochlorites may be employed in a solution having any desired percentage strength, the important point being, not the quantity of solvent, but the amount of hypochlorite employed, the specific proportion given being used merely because the solution of this strength may readily be obtained commercially. Furthermore the hypochlorites may, if desired, be employed in dry form, especially when a powdered dentifrice is desired. The quantity of hypochlorite is, furthermore, subject to wide variation, the amount used being determined largely by the flavor produced, as obviously a preponderance of hypochlorite would develop a somewhat unpleasant taste.

While I have found that the proportion indicated in the above formula will have the desired effect, I thoroughly understand that a very much greater proportion may be used, if desired, with equal effectiveness, and that all quantities less than that disclosed will likewise be of some benefit. Consequently, I do not wish to be understood as limiting my invention to approximately the quantity of hypochlorite disclosed.

I also have embodied in the sample formula, a relatively small amount of sodium thiosulfate; but obviously, this quantity will vary in accordance with the amount of hypochlorite used, and the amount needed will depend to a great extent upon the nature of the other ingredients, the consistency of the dentifrice, the nature of its container, and the time and conditions of storage prior to use, as all these factors will affect the quantity of chlorine developed by incidental decomposition of the hypochlorite. The amount of chlorine so produced can be readily ascertained in practice, and the proportion of thiosulfate necessary to neutralize such chlorine can be readily computed therefrom. My invention, therefore, is obviously not limited to the proportion of thiosulfate disclosed, my intention being to employ only sufficient thiosulfate to neutralize the chlorine incidentally generated.

In compounding my composition, I prefer first to mix the calcium carbonate, soap, alcohol, glycerine, and zinc chloride, the latter being preferably dissolved in the alcohol prior to mixing with the other ingredients. It will be apparent that this step of the process applies to any suitable proportion or selection of the usual dentifrice components, all of which, except the flavors, are preferably mixed as the first step in compounding. I then mix the flavors thoroughly, and add thereto the chlorine-releasing substance, which may be in the form of the well-known Carrel-Dakin solution, as the latter is readily obtainable commercially. The combination of chlorine-releasing material and flavors is allowed to stand until any chlorine evolved by the intermixture has disappeared, the potassium iodide starch test being a ready means for ascertaining the absence of any free chlorine emanation. When no more chlorine is given off, the chlorine-fixing substance, such as sodium thiosulfate, is added to the mixture of flavors and chlorine-releasing substance; and, if desired, zinc chloride may be added therewith instead of in the batch formed in the first step of the process. The two mixtures are finally combined and intermingled to produce a chlorine-releasing composition.

It will be apparent that with this process, the substances forming the embodiment of my invention are preferably mixed separately from those which are in general use, permitting, if desired, the employment of a fixed and balanced chlorine-liberating composition which can be employed in suitable proportions with various well-known dentifrice materials. Furthermore, while I have disclosed the preferred method of compounding a composition involving my invention, it will be apparent that the invention is not limited to this process, as it includes broadly the employment of a chlorine-releasing substance in a dentifrice, regardless of the process by which the dentifrice is manufactured.

While I prefer to embody my invention in a paste, it will be apparent that by suitably proportioning the fluid and solid constituents, the dentifrice may be produced in liquid form with equal facility; but my invention is not limited to either of these physical forms, as it embodies also the employment of dry chlorine releasing substances, such as hypochlorites, in a dry powdered dentifrice, the other ingredients of which may consist of the substances well-known in the art and in common use in such dentifrices.

It will be apparent that I have provided a dentifrice which, besides possessing the usual cleansing, astringent, and healing properties of the well-known substances included therein, has also an extremely powerful effect upon foreign matter on or between the teeth, tending to disintegrate such matter by the powerful effect of chlorine and oxygen, and effectually killing all bacteria with which the dentifrice comes in contact, the paste and liquid forms being particularly adapted to be carried by the fluids of the mouth into the remotest crevices, and possessing an efficacy therein independent of the action of the tooth brush.

I have, furthermore, provided in my preferred composition a completely balanced combination of substances, whereby a harmfully powerful action is completely prevented without depriving the dentifrice of its full effect.

It will be evident that I have employed an extremely powerful antiseptic and detergent agent in a dentifrice, in such a way that it will have no harmful effect upon the sensitive tissues of the mouth, will not produce a substantially disagreeable flavor, and if swallowed, will have no serious effect.

While I have described the preferred form of my invention and have indicated certain substitutions and changes therein, it will be apparent that many other substitutions and variations therein may be made within the scope of my broad invention as set forth in this specification.

I claim:

1. A tooth paste comprising, in combination, a substance forming the body of the tooth paste, and a chlorine-releasing substance completely intermingled with said body substance in fixed proportion to form a homogeneous mass, the proportion of chlorine-releasing substance employed determining the relative amount of chlorine released.

2. A tooth paste comprising, in combination, a substance forming the body of the tooth paste, and a hypochlorite completely intermingled with said body substance in fixed proportion to form a homogeneous mass, the proportion of the hypochlorite employed determining the amount of chlorine released.

3. A dentifrice comprising, in combination, a chlorine-releasing substance, and a substance adapted to fix free chlorine released thereby.

4. A dentifrice comprising, in combination, a chlorine-releasing substance, and a chlorine-fixing substance in insufficient quantity to fix the total amount of chlorine which can be given off by said chlorine-releasing substance.

5. A dentifrice comprising, in combination, a hypochlorite, and a chlorine-fixing substance intermixed therewith.

6. A dentifrice comprising, in combination, a hypochlorite and a thiosulfate.

7. A dentifrice comprising, in combination, a chlorine-releasing substance and a thiosulfate.

8. In the process of compounding a dentifrice which includes a chlorine-releasing substance, an essential oil, and a body forming substance, that step which includes the mixing of the chlorine-releasing substance with the essential oil prior to the addition of the mixture to the body forming substance.

9. In the process of compounding a dentifrice which includes a chlorine-releasing substance, an essential oil and a chlorine-fixing substance, the steps which includes intermingling the chlorine-releasing substance with the essential oil, waiting until the ebullition of chlorine ceases, and then adding thereto the chlorine-fixing substance prior to the intermingling of the mixture with the other ingredients.

Signed at New York in the county of Kings and State of New York this 8th day of January, A. D. 1920.

ERNEST D. RESNIK.